US005494142A

United States Patent [19]
Kale

[11] Patent Number: 5,494,142
[45] Date of Patent: Feb. 27, 1996

[54] POWER TAKE OFF CLUTCH ENGAGEMENT CONTROL SYSTEM

[75] Inventor: Satish L. Kale, Willowbrook, Ill.

[73] Assignee: Case Corporation, Racine, Wis.

[21] Appl. No.: 283,577

[22] Filed: Aug. 1, 1994

[51] Int. Cl.⁶ ..................................................... F16D 67/04
[52] U.S. Cl. .................... 192/12 C; 192/103 F; 192/109 F; 74/11
[58] Field of Search .................. 192/12 C, 56 F, 192/103 F, 109 F; 74/11, 15.2; 180/53.1; 477/171, 172, 175, 176, 177

[56] References Cited

U.S. PATENT DOCUMENTS

| | | |
|---|---|---|
| 3,752,284 | 8/1973 | Brittain et al. . |
| 4,019,614 | 4/1977 | Prenzel et al. . |
| 4,343,387 | 8/1982 | Hofbauer . |
| 4,344,499 | 8/1982 | van der Lely et al. . |
| 4,457,411 | 7/1984 | Hiramatsu . |
| 4,487,303 | 12/1984 | Boueri et al. . |
| 4,518,068 | 5/1985 | Oguma et al. . |
| 4,760,902 | 8/1988 | Bellanger . |
| 5,237,883 | 8/1993 | Churchill et al. . |
| 5,251,132 | 10/1993 | Bulgrien . |
| 5,299,129 | 3/1994 | Uchida et al. ............... 74/11 X |

Primary Examiner—Richard M. Lorence
Attorney, Agent, or Firm—Foley & Lardner

[57] ABSTRACT

A power take off (PTO) clutch control system is disclosed herein. The PTO clutch is a hydraulic clutch which is operated by a proportional valve capable of pressurizing the clutch with hydraulic fluid at a pressure related to the pulse width of a pulse width modulated (PWM) signal applied to the valve. The PWM signal is produced by a controller which monitors the output shaft speed and movement to determine the time at which the shaft begins movement. Prior to shaft movement, the PWM signals control the proportional valve to engage the clutch slowly and smoothly to avoid producing unacceptably high torques in the PTO shaft connected to the clutch during clutch engagement.

22 Claims, 5 Drawing Sheets

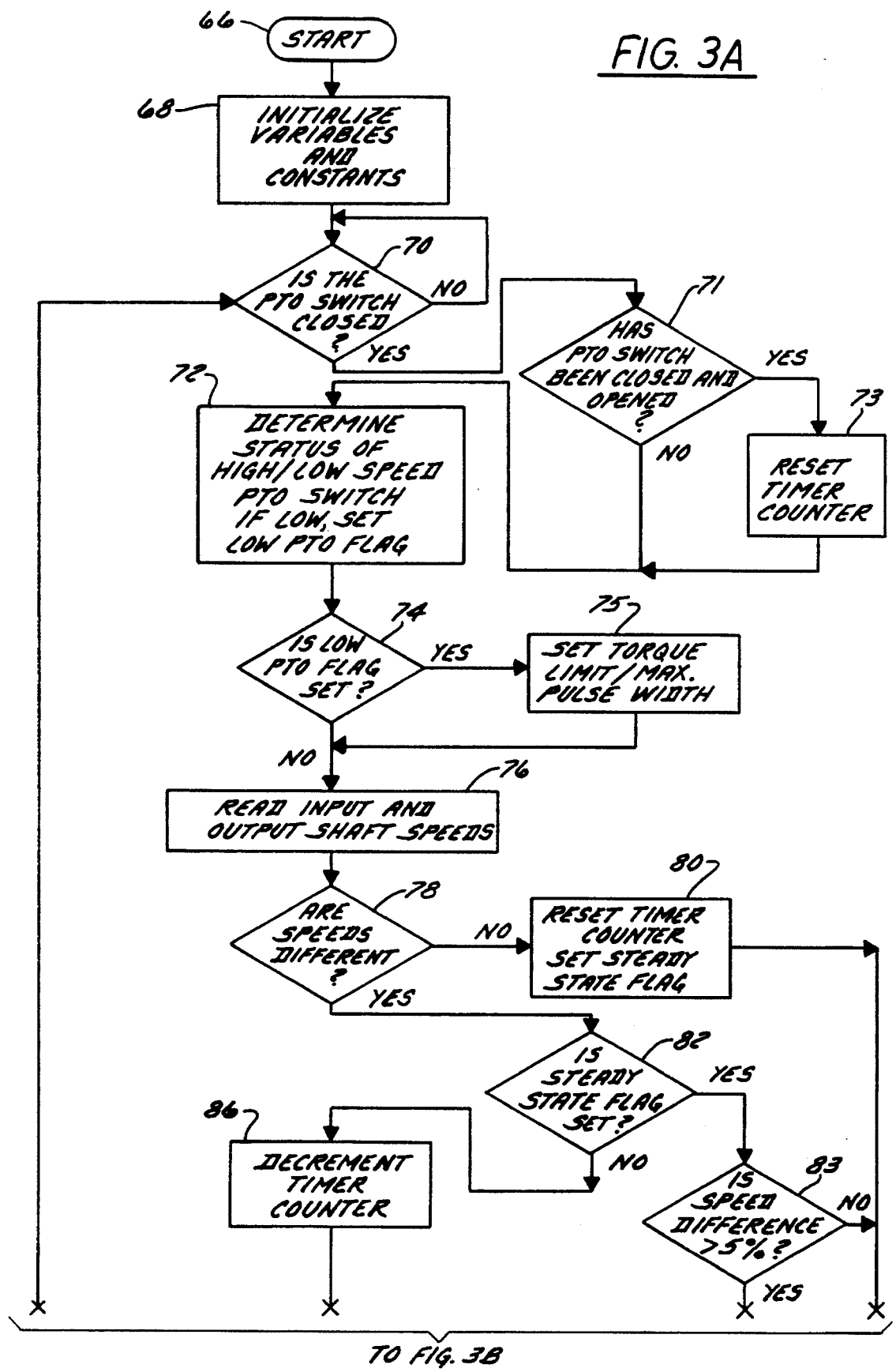

POWER TAKE OFF CLUTCH ENGAGEMENT CONTROL SYSTEM

FIELD OF THE INVENTION

The present invention relates to the power take off (PTO) for an agricultural vehicle such as a tractor. In particular, the present invention relates to a control system for controlling the operation of a PTO clutch to provide relatively smooth clutch engagement.

BACKGROUND OF THE INVENTION

PTOs are used on agricultural vehicles such as tractors to provide power for equipment or implements such as combines, mowers and spreaders. As the use of PTOs developed, most tractor manufactures standardized on 1000 RPM and 540 RPM PTOs. This standardization involved the use of a common size shaft and spline arrangement for each RPM rating. When the shaft sizes were standardized years ago, tractors had relatively low horsepower (e.g. 30 to 50 horsepower). Accordingly, the torque output of a PTO shaft was limited by the horsepower of the tractor.

Modern tractors commonly have horsepower ratings in excess of 100 horsepower. However, the shaft sizes for PTOs have not changed due to the need to maintain compatibility with older equipment and maintain the standardization for PTOs. Thus, the torque output of PTOs for many modern tractors is no longer limited by the tractor horsepower. Rather, the torque output is limited by the strength of the PTO shaft and the failure thereof. For the very high horsepower tractors (e.g. over 130 horsepower) manufacturers have eliminated the 540 RPM PTO shaft. Due to the gear reduction required to achieve a PTO speed of 540 RPM at engine idle, the very high horsepower tractors can apply a torque to the 540 RPM shaft in excess of that required for the shaft to fail.

In addition to causing PTO shaft failures, the torque produced by the higher horsepower tractors can accelerate equipment attached to the respective PTO at a rate which can damage the equipment. In an attempt to limit acceleration of the PTO shaft, PTO clutch controls have been used to monitor the speed of the input and output shafts of the PTO clutch. Based upon the monitored speeds, the controls turn the clutch control valve ON and OFF in a cyclic fashion to limit the rate at which the PTO shaft is accelerated. However, since PTO clutch control valves are typically either fully ON or OFF, the acceleration of the PTO shaft occurs in a step-wise manner which may in itself introduce undesirable torque pulses into the PTO shaft and associated implement.

In view of the problems involved in the control of PTO shafts in high horsepower tractors, it would be useful to provide a PTO clutch control system for protecting PTO shafts from catastrophic failure, and providing PTO shaft accelerations at rates which protect the shafts and attached implements during clutch engagement.

SUMMARY OF THE INVENTION

The present invention relates to a PTO control system for vehicles such as farm tractors including a power take-off (PTO) shaft for supplying rotational motion to an implement of the type which may be stationary or towed by the tractor. Power is transferred to the PTO shaft by a clutch including an input shaft coupled to a power source and an output shaft coupled to the PTO shaft, wherein the clutch includes a plurality of clutch plates operable to translate through a distance prior to clutch engagement. Upon clutch plate engagement, the clutch transmits torque between the input and output shafts to reduce the peak torques which normally occur during clutch engagement.

The control system includes a clutch control configured to translate the clutch plates through the distance to engage the clutch plates in response to a first control signal, and an output transducer disposed to generate an output signal representative of the rotational speed of the output shaft. A system control circuit is coupled to the clutch control, and the output transducer. The control circuit monitors the output signal and applies the first control signal to the clutch control until the output signal is representative of a rotational speed of the output shaft greater than zero.

BRIEF DESCRIPTION OF THE DRAWINGS

FIGS. 3A and 3B are flow charts representative of the control function of the control system;

DETAILED DESCRIPTION OF THE PREFERRED EMBODIMENT

Figure 1:
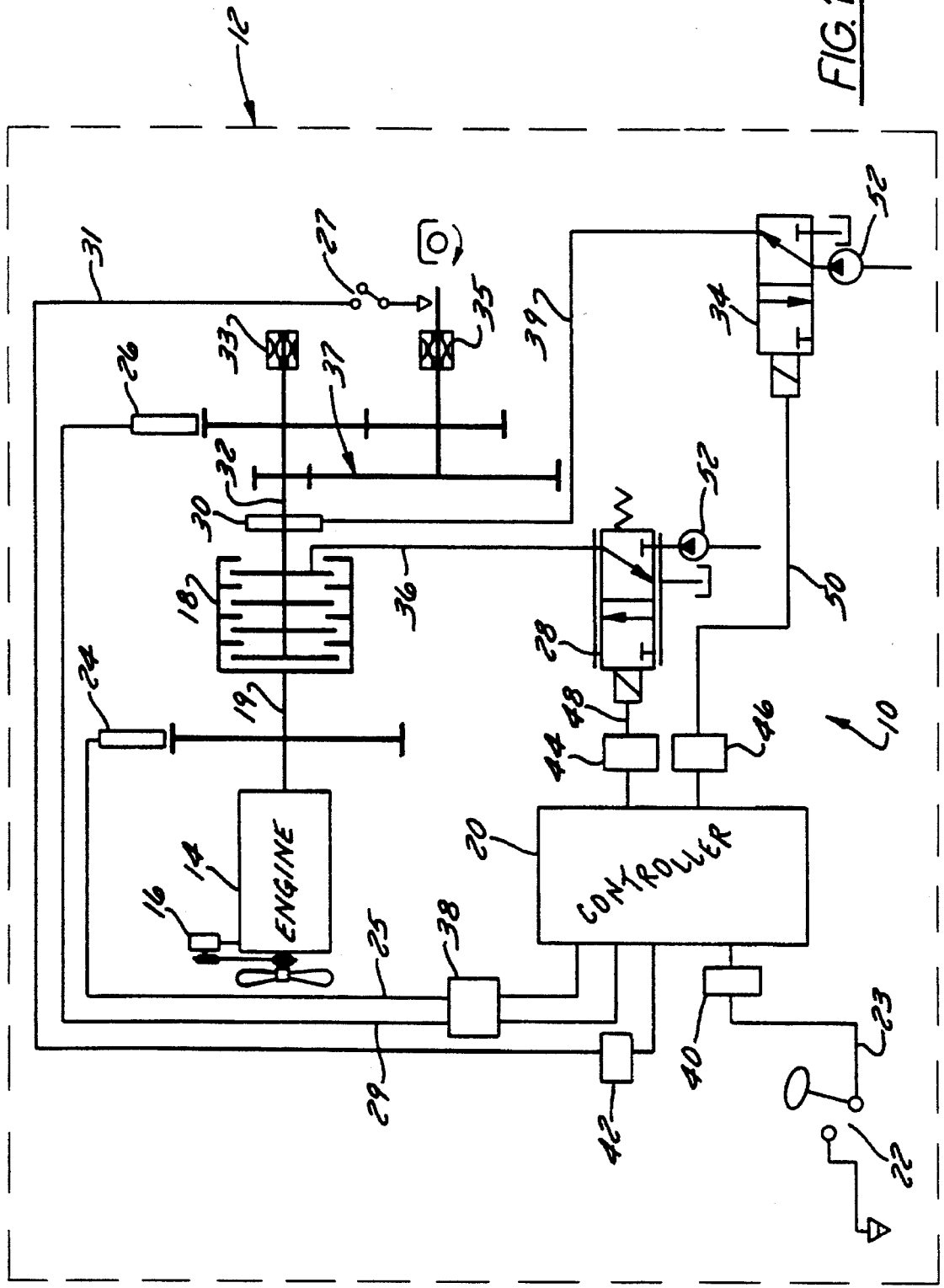
FIG. 1 is a schematic block diagram of a PTO drive and control system.

Turning to FIG. 1, a power takeoff (PTO) clutch and brake control system 10 for an agricultural vehicle such as a tractor schematically represented by the dashed line labeled 12 is shown. With the exception of the PTO clutch control system 10, tractor 12 may be a conventional agricultural tractor of the type including an engine 14 having conventional accessories such as an alternator 16. Engine 14 is the power source for tractor 12 and, in addition to providing power to the drive wheels (not shown) of tractor 12, provides the power to apply rotational motion to a multi-plate hydraulically actuated PTO clutch 18.

Control system 10 includes a controller 20 (e.g. a digital microprocessor such as the Intel TN83C51FA), a PTO on/off switch 22, a PTO input clutch speed transducer 24, and an output clutch speed transducer 26, a PTO status switch 27, a normally closed, solenoid operated, hydraulic, proportional clutch control valve 28. By way of example, transducers 24 and 26 may be variable reluctance sensors; however, signals representative of the rotational speed of the input shaft of clutch 18 may be derived from alternator 16.

In addition to controlling clutch 18, system 10 may control a hydraulic brake 30 which inhibits rotational motion of PTO output shaft 32 when clutch 18 is not fully engaged. System 10 includes a hydraulic valve 34 connected to brake 30 by hydraulic conduit 39. Valve 34 engages and disengages brake 30. Brake 30 is biased to inhibit rotation of shaft 32. Accordingly, valve 34 is normally closed, and opened when brake 30 is to be released. Depending upon the application and the configuration of valve 28 and the hydraulic conduit 36 which connects valve 28 to clutch 18, valve 34 may be eliminated by connecting brake 30 directly to conduit 36. Accordingly, as valve 28 applies pressurized hydraulic fluid to engage clutch 18, the pressurized fluid would also release brake 30. By configuring conduits 36 and 38 appropriately, the engagement of clutch 18 and releasing of brake 30 can be synchronized to avoid engaging clutch 18 without appropriately releasing brake 30.

Transducers 24 and 26 are coupled to digital inputs of controller 20 by electrical conductors 25 and 29, and conditioning circuits 38 which may be integral to controller 20. Conditioning circuits 38 filter radio and other undesirable frequencies of interference from the signals produced by transducers 24 and 26 or alternator 16, and introduced in conductors 25 and 29. Additionally, circuit 38 places the signals produced by transducers 24 and 26 or alternator 16 within a 5 V range and provides these signals with a generally squarewave configuration which can be appropriately sampled by controller 20. In operation, transducer 24 produces a signal representative of (e.g. proportional to) the rotational speed of the input shaft 19 of clutch 18, and transducer 26 produces a signal representative of (e.g. proportional to) the rotational speed of the clutch output shaft 32. Accordingly, the signals applied to controller 20 by transducers 24 and 26 have a generally squarewave configuration with a frequency proportional to the rotational speed of input shaft 19 and output shaft 32, respectively.

Switches 22 and 27 each include an associated conditioning circuit 40 and 42, respectively which may be integral to controller 20. Depending upon the application, circuits 40 and 42 may provide signal inversion and appropriate filtering to eliminate switch bounce. However, depending upon the type of controller 20 used, circuits 40 and 42 may be eliminated. The signals produced by switches 22 and 27 are applied to digital inputs of controller 20 via electrical conductors 23 and 31, respectively.

Hydraulic valves 28 and 34 are coupled to digital outputs of controller 20 by appropriate amplification and signal conditioning circuits 44 and 46 integral to controller 20, and electrical conductors 48 and 50, respectively. As will be discussed in detail below, controller 20 applies a pulse-width modulated (PWM) signal to valve 28 via electrical conductor 48 and circuit 44, and applies a digital on/off signal to valve 34 via electrical conductor 50 and circuit 46. Due to the nature of the solenoids which operate valves 28 and 34, amplification and isolation circuits 44 and 46 are required to produce a control signal having sufficient voltage and current to operate valves 28 and 34. Additionally, due to inductive kickbacks which may potentially be produced by the solenoids of valves 28 and 34, isolation may be required in circuits 44 and 46 to protect controller 20.

Turning to the operation of valve 28, valve 28 is a proportional hydraulic valve which applies hydraulic fluid to clutch 18 from the system hydraulic fluid source 52 at a pressure which is related to (e.g. proportional to) the time-averaged voltage applied to the solenoid associated with valve 28. Thus, the pressure of the fluid applied to clutch 18 via hydraulic conduit 36 by valve 28 may be controlled by applying a variable voltage signal to valve 28, or may be controlled by applying a PWM signal to the solenoid of valve 28. Where a PWM signal is applied to the solenoid of valve 28 to control the pressure of the hydraulic fluid applied to clutch 18, as in the presently preferred embodiment, the pressure of the fluid is proportional to the pulse width of the PWM signal produced by controller 20.

As discussed above, clutch 18 is a multi-plate hydraulic clutch. This type of clutch is capable of transferring a torque from clutch input shaft 19 to output shaft 32, where the torque is generally proportional to the pressure of the hydraulic fluid applied to clutch 18. (Shaft 19 is coupled to engine 14. Shaft 32 is directly coupled to the 1000 RPM PTO (high speed PTO) output shaft 33 (or a high speed output shaft of another speed rating such as 750 RPM), and is coupled to the 540 RPM PTO (low speed PTO) shaft 35 by a reduction gear 37.) Accordingly, the torque transferred between shafts 19 and 32 will be generally proportional to the pulse width (duty cycle) of the PWM signals applied from controller 20 to the solenoid of valve 28. Ideally, it may be convenient to have the torque transferred between shafts 19 and 32 exactly proportional to the pulse width of the PWM signals applied to the solenoid of valve 28; however, in mechanical systems, such a relationship is difficult to obtain. Accordingly, controller 20 is programmed to compensate for the inability to obtain such proportionality, and overall non-linearity in the electronics and mechanism of the control system 10.

Figure 2:
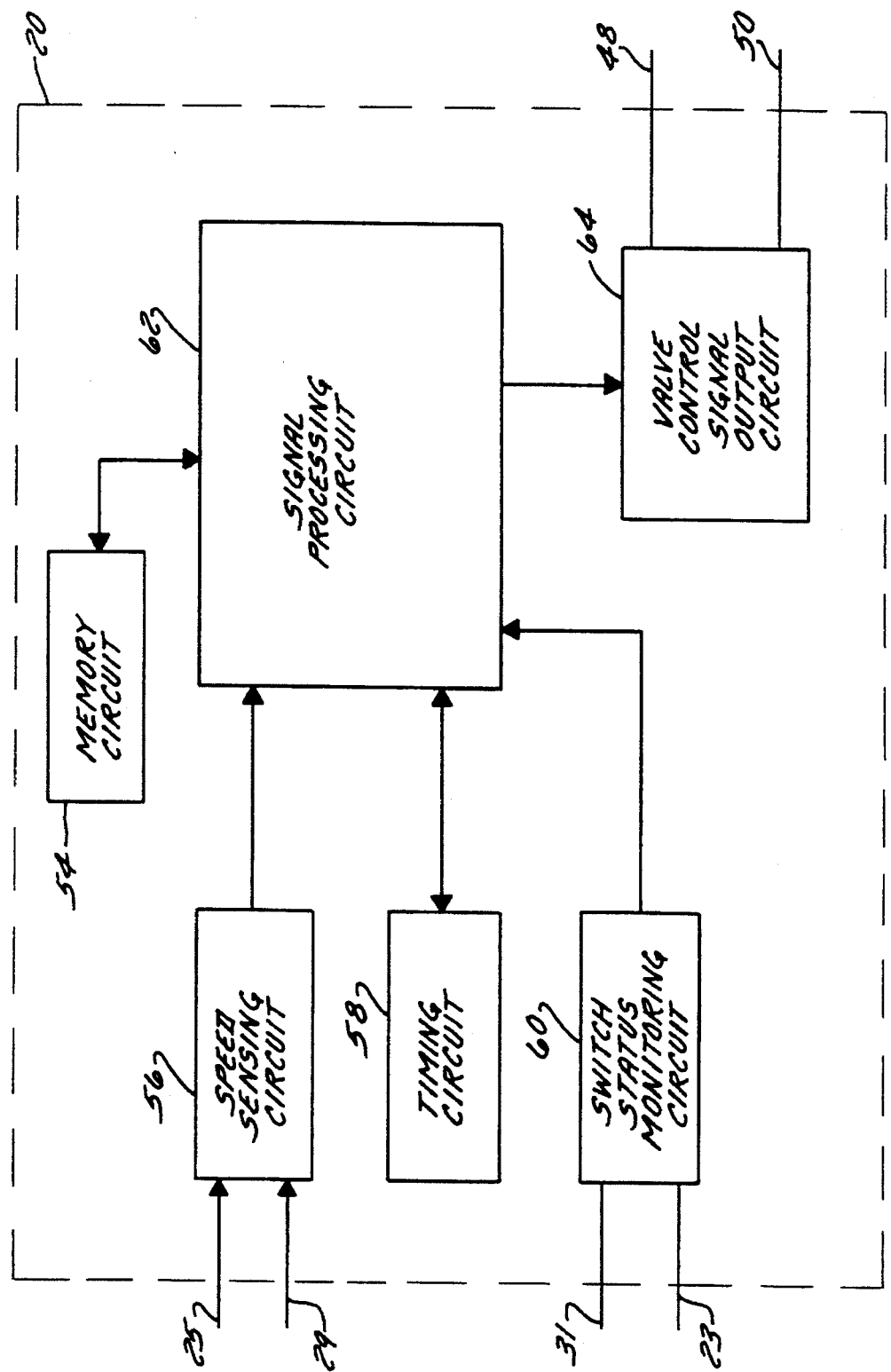
FIG. 2 is a schematic block diagram representative of the circuit configuration for the controller of the control system.

Referring to FIG. 2, controller 20 includes a memory circuit 54 having RAM and ROM, and is configured (programmed) to provide the operations of a speed sensing circuit 56, a timing circuit 58, a switch status monitoring circuit 60, a signal processing circuit 62, and a valve control signal output circuit 64. The direction and channels for data flow between circuits 54, 56, 58, 60, 62 and 64 are shown in FIG. 2. The ROM of memory circuit 54 stores those values required for system 10 initialization, and the constants required for the operation of certain programs run by controller 20. The RAM of memory 54 provides the temporary digital storage required for controller 20 to execute the system program.

Speed sensing circuit 56 receives the signals from transducers 24 and 26 which are applied to conductors 25 and 29, and converts the signals to digital values representative of the rotational speeds of shafts 19 and 32, respectively. Timing circuit 58 includes counters which are utilized by signal processing circuit 62 while executing the programming represented by the flow charts of FIGS. 3A and 3B. Switch status monitoring circuit 60 converts the signals applied by switches 22 and 27 to conductors 23 and 31 to digital values representative of the status of these switches. Valve control signal output circuit 64 produces a 400 Hz PWM signal applied to the solenoid of valve 28 via conductor 48 and isolation circuit 44 having an appropriate pulse width, and produces the on/off signal applied to valve 34 via conductor 50 and circuit 46. As briefly discussed below, the program executed by controller 20 is executed at 100 Hz. Thus, the pulse width of the signal produced by circuit 64 is updated every 10 milliseconds or every 4 cycles of the PWM signal.

Figure 3B:
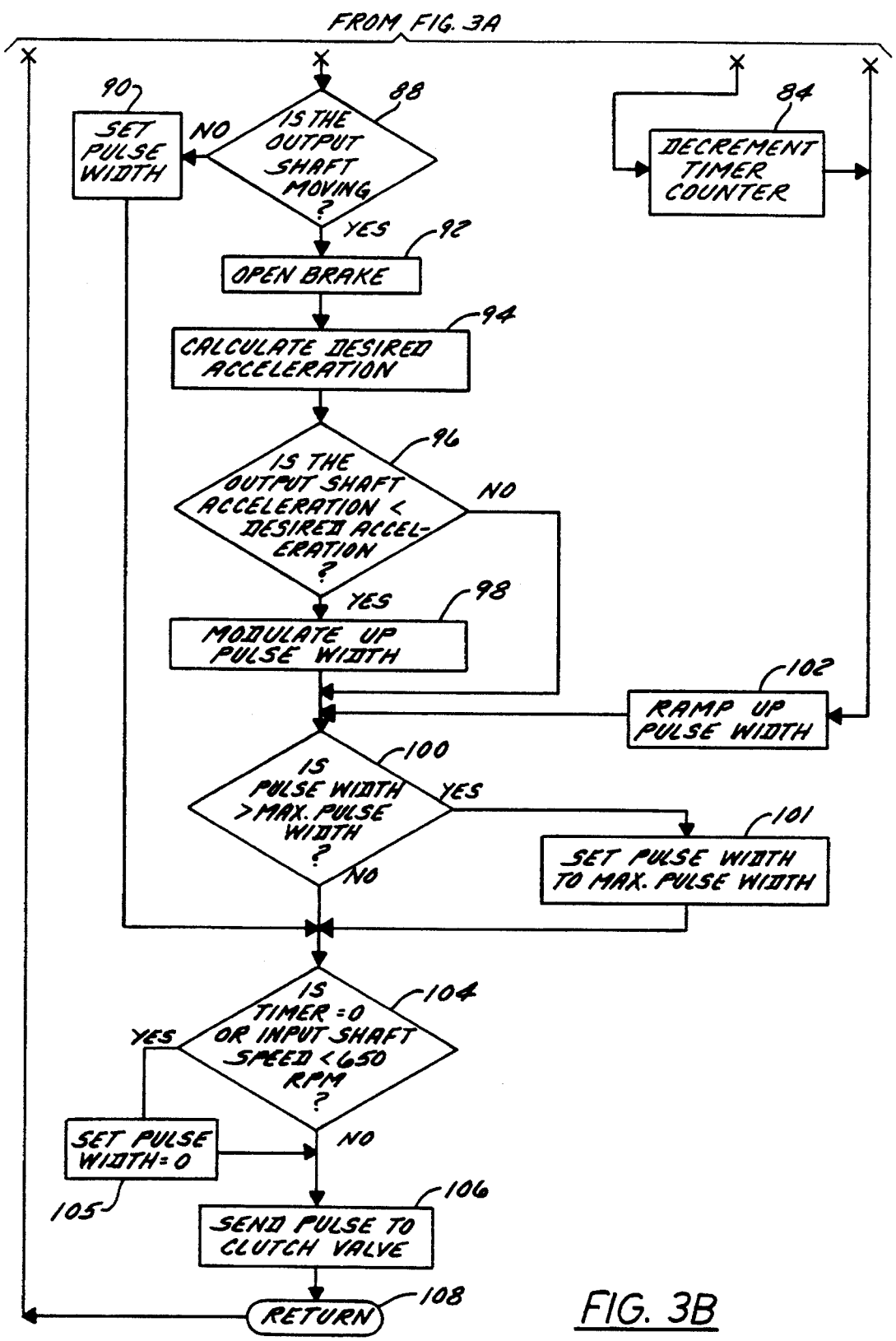

The operation of signal processing circuit 62 will now be described in detail in reference to FIGS. 3A, 3B, 4 and 5. (FIGS. 3A and 3B represent the operational steps of the program run by controller 20.) Upon startup (step 66), controller 20 reads the ROM of memory circuit 54 and initializes the counter in timing circuit 58 to a number of counts representative of 6 seconds. In addition, controller 20 initializes those other variables and constants which may be utilized in the programming of controller 20 (step 68). In step 70, circuit 62 reads the digital value representative of the status of PTO switch 22 from circuit 60, and returns if switch 22 has not been closed. If switch 22 is closed, after it was detected open, circuit 60 executes the steps required to begin engagement of clutch 18.

In step 71, circuit 62 accesses circuit 60 to determine if switch 22 was opened and closed. If switch 22 was opened and closed, circuit 62 sets the counts in timing circuit 58 to a number representative of approximately 2 seconds (step 73). If switch 22 was not opened and closed, circuit 62 advances to step 72.

In step 72, circuit 62 reads the digital value representative of the status of switch 27 from circuit 60 and determines whether or not the PTO is operating as a 1000 RPM PTO or a 540 RPM PTO. If switch 27 produces a signal representative of a 540 RPM PTO (low speed), a LOW PTO flag is set. In step 74, circuit 62 determines whether or not the LOW PTO flag is set. If the LOW PTO flag is set, circuit 62 calculates the torque limit for clutch 18 at step 75 and stores a value in the RAM of circuit 54 representative of the maximum pulse width of the PWM signal to be applied to the solenoid of valve 28 during operation of the 540 RPM PTO. The maximum pulse width depends upon the configuration of tractor 12, and is set so that the torque transferred by clutch 18 is less than the maximum torque at which the 540 RPM PTO shaft will fail.

Since the reduction required to reduce the speed of the 540 RPM shaft to approximately 50% of the 1000 RPM shaft is approximately 2 to 1, a torque is applied to the 540RPM shaft which is approximately twice as large as the torque which can be applied to the 1000 RPM shaft for given engine torque. Accordingly, the maximum pressure applied to the clutch through the valve 28 during operation of the 540 RPM shaft to transmit the same torque is approximately 50% of the maximum pressure applied to the clutch through the valve 28 during the operation of the 1000 RPM PTO shaft. This pressure is controlled by changing the width of the PWM signal applied. The maximum pulse width value of the PWM signal associated with the 540 RPM PTO shaft is stored in the ROM of circuit 54. At step 74, if circuit 62 determines that the LOW PTO flag is not set, circuit 62 will utilize the maximum pulse width value stored in circuit 54 which is associated with the maximum torque clutch 18 can transfer between shafts 19 and 35 during operation of the 540 RPM PTO shaft, without causing failure of the 540 RPM PTO shaft due to torque overload.

In step 76, circuit 62 reads the digital values representative of the rotational speeds of input shaft 19 and output shaft 32 from circuit 56. In step 78, circuit 62 compares the speeds of shafts 19 and 32. If the shaft speeds are the same, circuit 62 resets timing circuit 58 to a count representative of 2 seconds, and sets a STEADY STATE flag (step 80). Subsequently, circuit 62 loops to execute step 102 and the steps beginning at step 100. At step 102 the pulse width value is increased by 1.00%. If the shaft speeds are different, processing continues at step 82.

In step 82, circuit 62 determines whether or not the STEADY STATE flag is set. If the STEADY STATE flag is set, circuit 62 determined if the speed difference between shafts 19 and 22 is greater then five percent (5%) (step 83). If it is greater than five percent, the time counter is decremented by 2.5 milliseconds (step 84), and circuit 62 jumps to the programming associated with steps 102 and then 100. If the STEADY STATE flag is not set, circuit 62 goes to step 86 wherein circuit 62 decrements the counter of circuit 58 by counts representative of 2.5 milliseconds. (The programming represents by the flow charts of FIGS. 3A and 3B runs at a rate of approximately 100 Hz. Accordingly, to decrement the timer counter in circuit 58, the counter must be decremented by the number of counts associated with 10 milliseconds.)

In step 88, circuit 62 reads the value representative of the rotational speed of output shaft 32 to determine whether or not shaft 32 is moving. If shaft 32 is moving, circuit 62 applies a digital signal to circuit 64, where circuit 64 responds to the signal by applying a signal to conductor 50 which causes valve 34 to release brake 30 (step 92). At step 90, if shaft 32 is not moving, circuit 62 reads the time from timer circuit 58 associated with the times since the PTO switch was closed and sets the pulse width value to a predetermined percentage (e.g. 20%) of the maximum pulse width value either set at step 75 in the case of operation at 540 RPM, or read from circuit 54 in the case of operation at 1000 RPM, if switch 22 has been closed for 300 milliseconds or less. If the time is greater than 300 milliseconds, the pulse width value is increased by 0.1% for each 10 millisecond increment of time elapsed subsequent to switch 22 being closed for 300 milliseconds. After setting the pulse width value at step 90, circuit 62 jumps to step 104.

In general, steps 88 and 90 are provided to produce smooth engagement of clutch 18. More specifically, before the plates of clutch 18 engage, a certain volume of hydraulic fluid must be provided to clutch 18 before the clutch plates of clutch 18 travel through the distance required to engage the clutch plates. During this clutch filling process, it is undesirable to apply hydraulic fluid to the clutch at a fixed or undesirably high pressure since the clutch will abruptly apply torque from shaft 19 to shaft 32. Such an abrupt application of torque can potentially cause damage to shaft 32 or an associated implement connected to the PTO output shaft. By initiating the filling of clutch 18 with a pressure equivalent to the pre-stress force applied by the clutch springs, the clutch plates move relatively slowly toward engagement, and the pressure is increased gradually until engagement. This process prevents the abrupt transfer of torque from shaft 19 to shaft 32.

Figure 4:
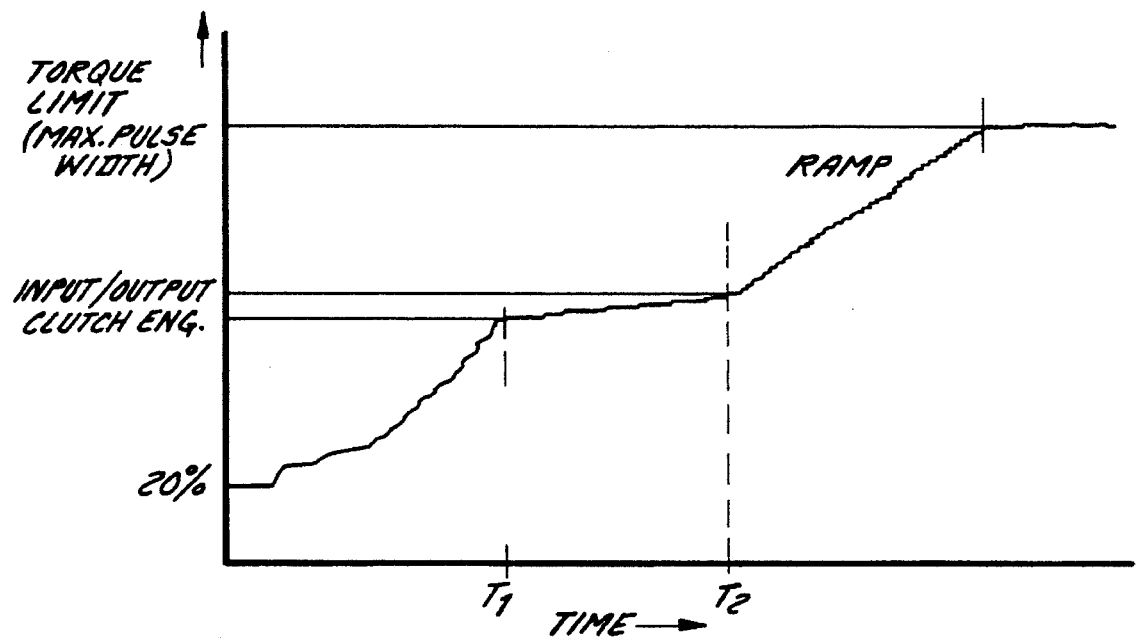
FIG. 4 is a graphical representation of a control signal applied to the hydraulic valve of the control system.

As shown in FIG. 4, the pulse width of the PWM signal is plotted against time. As shown, the first motion of the output shaft occurs at time T1 (i.e., initial clutch engagement), the pulse width of the PWM signal having been initiated at a certain % duty cycle (e.g. 20%) at time T0 and increased in gradual steps until output shaft 32 begins moving as determined at step 88. At time T2, the clutch is fully locked up.

Referring to FIG. 3B, in step 94, circuit 62 calculates a desired acceleration by dividing the speed at shaft 19 by 2.5 seconds. In general, step 94 is the start of the process for controlling clutch 18 to accelerate output shaft 32 relative to shaft 19 until the speed of shaft 32 reaches its steady state speed (no clutch 18 slip) which equals or is proportional to the speed of shaft 19. The acceleration of shaft 94 is calculated based upon 2.5 seconds, which was selected based upon experimentation to provide optimum acceleration of shaft 32. However, depending upon the system configuration, this time period may be varied according to the particular tractor and PTO application. The calculated acceleration serves as a reference for accelerating shaft 32 relative to shaft 19.

In step 96, circuit 62 calculates the shaft acceleration by reading the current speed of shaft 32 from circuit 56, and the speed of shaft 32 monitored during the previous loop through steps 70–108. Steps 70–108 are executed every 10 milliseconds; thus, the shaft acceleration is the change in shaft speed between program loops divided by 10 milliseconds. If the actual acceleration of shaft 32 is less than the desired shaft acceleration, the current pulse width is increased by 0.1% (step 98). If the actual acceleration of shaft 32 is greater than or equal to the desired acceleration, the pulse width value is not changed. In certain systems, it may be desirable to reduce the pulse width value when the actual acceleration of shaft 32 is greater than the desired acceleration. However, this type of control may cause hunting, and thus, an acceleration of shaft 32 which is not smooth. Accordingly, in the presently preferred embodiment of system 10, the pulse width value is not modified when the actual acceleration of shaft 32 exceeds the desired acceleration.

Figure 5:
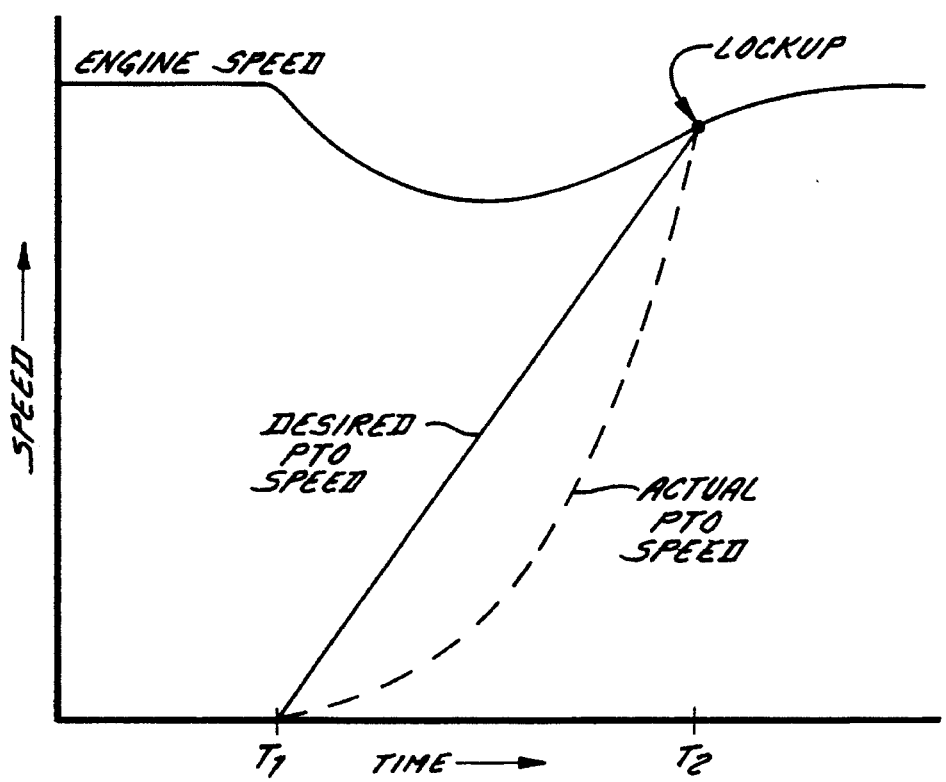
FIG. 5 is a graphical representation of the actual and desired accelerations of the PTO shaft.

Referring to FIG. 4, the increase in the pulse width value which occurs during the execution of steps 94, 96 and 98 is shown between times T1 and T2. As shown, this pulse width value is increased incrementally at a rate of 0.1% change at each 10 millisecond interval, if the actual acceleration is less than the desired acceleration. Referring to FIG. 5, examples of the desired and actual speeds for shaft 32, and engine speed are plotted against time. As shown, at time T1, shaft 32 begins to rotate, and at time T2, the speed of shaft 32 equals the speed of shaft 19 (lock-up). At time T2, the speeds of shafts 19 and 32 are equal or proportional, and circuit 62 executes steps 100, 101 and 102 to ramp up the pulse width value to produce a clutch pressure in clutch 18 associated with the maximum torque to be transmitted between shafts 32 and 19. In step 100, the current pulse width value is compared with the maximum pulse width value set determined at step 75 in case of operation at 540 RPM, and the PWM value stored in circuit 54 in case of operation at 1000 RPM. If the current pulse width value set at step 98 or step 102 is greater than the maximum pulse width value, the pulse width value is set to the maximum pulse width value (step 101).

In step 104, circuit 62 checks the count of the timer in circuit 58 to determine whether or not the timer has timed out. If the timer equals 0, then either motion of shaft 32 did not occur within 6 seconds (timer count at initialization), or the speed difference between shafts 19 and 32 subsequent to time T2 (lock-up) has been greater than 5% for more than 2 seconds which indicates undesirable slippage in clutch 18. In step 104, circuit 62 also determines if the speed of shaft 19 has gone below 650 RPM. If either the timer count has reached 0 or the speed of shaft 19 has gone below 650 RPM, circuit 62 sets the pulse width to zero (step 105). In step 106, circuit 62 applies the present pulse width value to circuit 64. In response, circuit 64 applies a pulse width modulated signal to valve 28 via conductor 48 at a frequency of 400 Hz with a pulse width corresponding to the current pulse width value which will be updated upon the next execution of steps 70 through 106. In step 108, circuit 62 returns to the execution of step 70.

Although various features of the control system are described and illustrated in the drawings, the present invention is not necessarily limited to these features and may encompass other features disclosed both individually and in various combinations. For example, developments in PTO clutches may make electric clutches cost effective for PTO applications. Accordingly, hydraulic clutch 18 and control valve 28 may potentially be replaced with an associated electric clutch and electric clutch control circuit.

What is claimed is:

1. In a vehicle having a power source for producing rotational motion, a power take-off (PTO) shaft for supplying rotational motion to at least one piece of equipment other than the vehicle, and a clutch including an input shaft coupled to the power source and an output shaft coupled to the PTO shaft, wherein the clutch includes a plurality of clutch plates operable to translate through a distance prior to clutch engagement and, upon clutch plate engagement, transmitting torque between the input and output shafts, a control system comprising:

a clutch control configured to translate the clutch plates through the distance to engage the clutch plates in response to a first control signal;

an output transducer disposed to generate an output signal representative of the rotational speed of the output shaft; and a control circuit coupled to the clutch control, and the output transducer, and being configured to monitor the output signal and apply the first control signal to the clutch control until the output signal is representative of a rotational speed of the output shaft greater than zero.

2. The system of claim 1, further comprising a brake coupled to the clutch control and disposed to inhibit rotation of the output shaft when the clutch is disengaged and when the first control signal is applied to the clutch control.

3. The system of claim 1, further comprising:

a brake control coupled to the control circuit; and a brake coupled to the brake control, the brake being disposed to inhibit rotation of the output shaft when the clutch is disengaged and when the first control signal is applied to the clutch control.

4. The system of claim 1, wherein the torque transmitted by the clutch between the input and output shafts is dependent upon the pressure between the clutch plates and the clutch control is further configured to force the clutch plates together at a pressure defined by second control signals applied to the clutch control, the system further comprising an input transducer disposed to generate an input signal representative of the rotational speed of the input shaft, the input transducer being coupled to the control circuit and the control circuit being further configured to monitor the input signal and, upon monitoring an output shaft speed greater than zero, applying second control signals to the clutch control to increase the pressure between the clutch plates at a pressurization rate which transmits torque from the input to the output shaft at levels which increase the rotational velocity of the output shaft at a rate less than a predetermined rate.

5. In a vehicle having a power source for producing rotational motion, a power take-off (PTO) shaft for supplying rotational motion to at least one piece of equipment other than the vehicle, and a clutch including an input shaft coupled to the power source and an output shaft coupled to the PTO shaft, wherein the clutch includes a plurality of clutch plates operable to translate through a distance prior to clutch engagement and, upon clutch engagement, transmitted torque between the input and output shafts, a control system comprising:

a clutch control configured to translate the clutch plates through the distance to engage the clutch plates in response to a first control signal;

an output transducer disposed to generate an output signal representative of the rotational speed of the output shaft; and a control circuit coupled to the clutch control, and the output transducer, and being configured to monitor the output signal and apply the first control signal to the clutch control until the output signal is representative of a rotational speed of the output shaft greater than zero, wherein the torque transmitted by the clutch between the input and output shafts is dependent upon the pressure between the clutch plates and the clutch control is further configured to force the clutch plates together at pressure defined by second control signals applied to the clutch control, the system further comprising an input transducer disposed to generate an input signal representative of the rotational speed of the input shaft, the input transducer being coupled to the control circuit and the control circuit being further configured to monitor the input signal and, upon monitoring an output shaft speed greater than zero, applying second control signals to the clutch control to increase the pressure between the clutch plates at a pressurization rate which transmits torque from the input to the output shaft at levels which increase the rotational velocity of the output shaft at a rate less than a predetermined rate, and wherein the PTO shaft will fail at a predetermined maximum torque and the control circuit is further configured to apply third control signals to the clutch control upon determining that the input and output shafts are rotating at the same velocity, the third control signals controlling the clutch control to increase the pressure between the clutch plates at a predetermined pressure increase rate to maximum pressure which inhibits relative motion of the input and output shafts until the torque transferred between the shafts exceeds a predetermined limit which is less than the predetermined maximum torque.

6. The system of claim 5, wherein the control circuit generates time values representative to time periods when the third control signals are applied to the clutch control, the input signals and output signals are not representative of input and output rotational shaft speeds which are substantially equal, and the control circuit applies a fourth control signals to the clutch control when the time values exceed a predetermined limit, the clutch control disengaging the clutch plates in response to the fourth signal.

7. A tractor comprising:

a power source for producing rotational motion;

a power take-off (PTO) shaft for supplying rotational motion to at least one piece of equipment;

a clutch including an input shaft coupled to the power source and an output shaft coupled to the PTO shaft, wherein the clutch includes a plurality of clutch plates operable to translate through a distance prior to clutch engagement and, upon clutch plate engagement, transmitting torque between the input and output shafts;

a clutch control coupled to the clutch and configured to translate the clutch plates through the distance to engage the clutch plates in response to a first control signal;

an output transducer disposed to generated an output signal representative to the rotational speed of the output shaft; and a control circuit coupled to the clutch control, and the output transducer, and being configured to monitor the output signal and apply the first control signal to the clutch control until the output signal is representative of a rotational speed of the output shaft greater than zero.

8. The tractor of claim 7, further comprising a brake coupled to the clutch control and disposed to inhibit rotation of the output shaft when the clutch is disengaged and when the first control signal is applied to the clutch control.

9. The tractor of claim 7, further comprising:

a brake control coupled to the control circuit; and a brake coupled to the brake control, the brake being disposed to inhibit rotation of the output shaft when the clutch is disengaged and when the first control signal is applied to the clutch control.

10. The tractor of claim 7, wherein the torque transmitted by the clutch between the input and output shafts is dependent upon the pressure between the clutch plates and the clutch control is further configured to force the clutch plates together at a pressure defined by second control signals applied to the clutch control, the system further comprising an input transducer disposed to generate an input signal representative of the rotational speed of the input shaft, the input transducer being coupled to the control circuit and the control circuit being further configured to monitor the input signal and, upon monitoring an output shaft speed greater than zero, applying second control signals to the clutch control to increase the pressure between the clutch plates at a pressurization rate which transmits torque from the input to the output shaft at levels which increase the rotational velocity of the output shaft at a rate less than a predetermined rate.

11. A tractor comprising:

a power source for producing rotational motion;

a power take-off (PTO) shaft for supplying rotational motion to at least one piece of equipment;

a clutch including an input shaft coupled to the power source and an output shaft coupled to the PTO shaft, wherein the clutch includes a plurality of clutch plates operable to translate through a distance prior to clutch engagement and, upon clutch engagement, transmitting torque between input and output shafts;

a clutch control coupled to the clutch and configured to translate the clutch plates through the distance to engage the clutch plates in response to a first control signal;

an output transducer disposed to generate an output signal representative or the rotational speed of the output shaft; and a control circuit coupled to the clutch control, and the output transducer, and the being configured to monitor the output signal and apply the first control signal to the clutch control until the output signal is representative of a rotational speed of the output shaft greater than zero, wherein the torque transmitted by the clutch between the input and output shafts is dependent upon the pressure between the clutch plates and the clutch control is further configured to force the clutch plates together at a pressure defined by second control signals applied to the clutch control, the system further comprising an input transducer disposed to generated an input signal representative of the rotational speed of the input shaft, the input transducer being coupled to the control circuit and the control circuit being further configured to monitor the input signal and, upon monitoring an output shaft speed greater than zero, applying second control signals to the clutch control to increase the pressure between the clutch plates at a pressurization rate which transmits torque from the input to the output shaft at levels which increase the rotational velocity of the output shaft at a rate less than a predetermined rate, and wherein the PTO shaft will fail at a predetermined maximum torque and the control circuit is further configured to apply third control signals to the clutch control upon determining that the input and output shafts are rotating at the same velocity, the third control signals controlling the clutch control to increase the pressure between the clutch plates at a predetermined pressure increase rate to a maximum pressure which inhibits relative motion of the input and output shafts until the torque transferred between the shafts exceeds a predetermined limit which is less than the predetermined maximum torque.

12. The tractor of claim 11, wherein the control circuit generates time values representative of time periods when the third control signals are applied to the clutch control, the input signals and output signals are not representative of input and output rotational shaft speeds which are substantially equal, and the control circuit applies a fourth control signals to the clutch control when the time values exceed a predetermined limit, the clutch control disengaging the clutch plates in response to the fourth signal.

13. The tractor of claim 11, further comprising a source of pressurized hydraulic fluid, the clutch being a hydraulic clutch wherein the plates are engageable at an engagement pressure related to the hydraulic pressure applied to the clutch, the clutch control including a hydraulic valve for coupling the clutch to the source of pressurized hydraulic fluid, and the hydraulic valve being a proportional valve configured to control the pressure of the fluid applied to the clutch from the source, wherein the pressure is dependent upon the first, second and third control signals.

14. The tractor of claim 13, further comprising:
a hydraulically operated brake coupled to the source of pressurized hydraulic fluid and disposed to inhibit rotation of the output shaft when the hydraulic clutch is disengaged.

15. The tractor of claim 14, wherein the hydraulic valve couples the brake to the source of pressurized hydraulic fluid.

16. The tractor of claim 14, further comprising a hydraulic brake valve coupled between the source of pressurized hydraulic fluid and the brake.

17. The tractor of claim 13, wherein the control circuit includes a digital processor configured to produce the first, second and third control signals which are pulse-width modulated signals having a predetermined frequency, and the pressure applied to the clutch is substantially proportional to the pulse-width of the modulated signals.

18. A power take-off (PTO) clutch control system for use in a tractor including a power take-off (PTO) shaft for supplying rotational motion to at least one piece of equipment other than the tractor, and a multi-plate clutch including an input shaft coupled to a power source and an output shaft coupled to the PTO shaft, wherein the clutch plates are operable to translate through a distance prior to clutch engagement and, upon clutch plate engagement, transmit torque between the input and output shafts, the system comprising:
movement means for translating the clutch plates through the distance to engage the clutch plates in response to a first control signal;
transducer means for generating an output signal representative of the rotational speed of the output shaft; and
control means for monitoring the output signal and applying the first control signal to the clutch control until the output signal is representative of a rotational speed of the output shaft greater than zero.

19. The system of claim 18, further comprising a means coupled to the clutch control and disposed to inhibit rotation of the output shaft when the clutch plates are disengaged and when the first control signal is applied to the movement means.

20. The system of claim 18, wherein the torque transmitted by the clutch plates between the input and output shafts is dependent upon the pressure between the clutch plates and the movement means forces the clutch plates together at a pressure defined by second control signals applied to the movement means, the system further comprising an input means for generating an input signal representative of the rotational speed of the input shaft, the control circuit monitoring the input signal and, upon monitoring an output shaft speed greater than zero, applying second control signals to the movement means to increase the pressure between the clutch plates at a pressurization rate which transmits torque from the input to the output shaft at levels which increase the rotational velocity of the output shaft at a rate less than a predetermined rate.

21. A power take-off (PTO) clutch control system for use in a tractor including a power take-off (PTO) shaft for supplying rotational motion to at least one piece of equipment other than the tractor, and a multi-plate clutch including an input shaft coupled to a power source and an output shaft coupled to the PTO shaft, wherein the clutch plates are operable to translate through a distance prior to clutch engagement and, upon clutch plate engagement, transmit torque between the input and the output shafts, the system comprising:
movement means for translating the clutch plates through the distance to engage the clutch plates in response to a first control signal;
transducer means for generating an output signal representative of the rotational speed of the output shaft; and
control means for monitoring the output signal and applying the first control signal to the clutch control until the output signal is representative of a rotational speed of the output shaft greater than zero;
wherein the torque transmitted by the clutch plates between the input and output shafts is dependent on the pressure between the clutch plates and the movement means forces the clutch plates together at a pressure defined by second control signals applied to the movement means, the system further comprising an input means for generating an input signal representative of the rotational speed of the input shaft, the control circuit monitoring the input signal and, upon monitoring an output shaft speed greater than zero, applying second control signals to the movement means to increase the pressure between the clutch plates at a pressurization rate which transmits torque from the input to the output shaft at levels which increase the rotational velocity of the output shaft at a rate less than a predetermined rate, and wherein the PTO shaft will fail at a predetermined maximum torque and the control means applies third control signals to the movement means upon determining that the input and output shafts are rotating at the same velocity, the third control signals controlling the movement means to increase the pressure between the clutch plates at a predetermined pressure increase rate to a maximum pressure which inhibits relative motion of the input and output shafts until the torque transferred between the shafts exceeds a predetermined limit which is less than the predetermined maximum torque.

22. The system of claim 21, wherein the control means generates time values representative of time periods when the third control signals are applied to the movement means, the input signals and output signals are not representative of input and output rotational shaft speeds which are substantially equal, and the control means applies a fourth control signals to the movement means when the time values exceed a predetermined limit, the movement means disengaging the clutch plates in response to the fourth signal.

* * * * *